US009636942B2

(12) United States Patent
Bisazza et al.

(10) Patent No.: US 9,636,942 B2
(45) Date of Patent: May 2, 2017

(54) METHOD FOR MANUFACTURING PRE-GROUTED MOSAIC TILES AND PREGROUTED MOSAIC TILE

(75) Inventors: Giuseppe Bisazza, Vicenza (IT); Dino Pauletto, Fossalta di Portogruaro (IT)

(73) Assignee: TREND GROUP S.P.A., Vicenza (IT)

(*) Notice: Subject to any disclaimer, the term of this patent is extended or adjusted under 35 U.S.C. 154(b) by 1412 days.

(21) Appl. No.: 13/388,366

(22) PCT Filed: Jul. 29, 2010

(86) PCT No.: PCT/IB2010/053458

§ 371 (c)(1),
(2), (4) Date: Feb. 1, 2012

(87) PCT Pub. No.: WO2011/015976

PCT Pub. Date: Feb. 10, 2011

(65) Prior Publication Data

US 2012/0128941 A1 May 24, 2012

(30) Foreign Application Priority Data

Aug. 3, 2009 (IT) ................................ VI2009A0206
Feb. 22, 2010 (IT) ................................ VI2010A0041

(51) Int. Cl.

*B32B 3/00* (2006.01)
*B44C 1/28* (2006.01)
*B44C 3/12* (2006.01)
*B32B 37/14* (2006.01)

(52) U.S. Cl.

CPC ................ *B44C 1/28* (2013.01); *B44C 3/123* (2013.01); *Y10T 428/24479* (2015.01)

(58) Field of Classification Search

CPC ............................ E04F 13/0862; B44C 3/123
USPC ........................................................ 156/242
See application file for complete search history.

(56) References Cited

U.S. PATENT DOCUMENTS

| | | | | |
|---|---|---|---|---|
| 3,335,048 A * | 8/1967 | Morain | B44C 3/123 428/137 |
| 2003/0077424 A1* | 4/2003 | Patel | B28B 19/0061 428/192 |

FOREIGN PATENT DOCUMENTS

| | | |
|---|---|---|
| DE | 2251645 | 4/1973 |
| DE | 29500612 | 3/1995 |
| FR | 2085921 | 12/1971 |
| FR | 2155146 | 5/1973 |
| WO | 2007110751 | 10/2007 |
| WO | 2008117316 | 10/2008 |

* cited by examiner

*Primary Examiner* — Matthew Daniels
*Assistant Examiner* — Marta Dulko
(74) *Attorney, Agent, or Firm* — St. Onge Steward Johnston & Reens, LLC

(57) ABSTRACT

A method of making pre-grouted mosaic panels, wherein each panel (1) is formed from a plurality of mosaic tiles (2) each having a upper surface (4) and a lower surface (5), the tiles (2) being laid over a substantially horizontal support base (S) in mutually spaced positions, to define a plurality of grooves (3). The method includes a step of placing a first thermoformable polymeric sheet element (10) on the upper (4) and lower (5) surfaces of the mosaic tiles (2) and a later step of thermoforming the first sheet element (10) for the latter to at least partially fill the grooves (3) when it is thermoformed. A pre-grouted mosaic panel that can be obtained by such method.

16 Claims, 6 Drawing Sheets

FIG. 6

METHOD FOR MANUFACTURING PRE-GROUTED MOSAIC TILES AND PREGROUTED MOSAIC TILE

FIELD OF THE INVENTION

The present invention generally finds application in the field of decorative arts and particularly relates to a method of making pre-grouted mosaic panels.

The invention further relates to a pre-grouted mosaic panel that can be obtained by the above method.

BACKGROUND ART

As known, traditional techniques for making pre-grouted panels made of mosaic tiles include a first step of laying tiles over a support base in a predetermined arrangement.

Particularly, the tiles are mutually offset in one or more predetermined directions to define a plurality of grooves.

Then, the grooves are filled with an appropriate resin, generally of thermoset type, having adequate flexibility to allow the panel to be also mounted to curved surfaces.

Typically, for proper tile positioning, a grid is used, which has a plurality of seats whose shape mates the shape of the tiles, and separated by a dual series of ribs designed to hold the tiles in spaced relation to define the grooves.

Then, the filling resin is directly poured onto the ribs, e.g. by suitable nozzles, and then cured to obtain the finished panel.

These prior art techniques still suffer from a number of recognized drawbacks, one of which consists in that excessive leakage of the jointing material always occurs in such processes.

This will require either provision of means for containing the filling material or removal of excess material.

A further drawback is that, in order to provide grooves of equal widths, the tiles are required to be locked in their position.

U.S. Pat. No. 3,335,048 and WO2005/092638 disclose methods for forming pre-grouted mosaic tile panels as described above, which include a further step in which a press is actuated to act upon the tiles.

Thus, the press will both allow containment of the filling material with the most uniform distribution, and locking of the tiles in their mutual positions.

WO2005/092638 provides a method of making pre-grouted panels in which a plurality of pneumatically operated pins are used, which press upon respective tiles to lock them in their preset position.

Nevertheless, these solutions have the drawback of not allowing simple control of the joint thicknesses, with negative effects on the aesthetic quality of the finished panel.

Furthermore, in addition to their complex and costly implementation, these prior art solutions have the additional drawback of forming joints having a flat and irregular top surface, which is of little aesthetic value.

DISCLOSURE OF THE INVENTION

The object of the present invention is to overcome the above drawbacks, by providing a method of making pre-grouted mosaic panels that is very simple and cost-effective.

A particular object is to provide a method of making pre-grouted mosaic panels that affords joint thickness control and prevents the filling material from leaking out of the exposed surface of the tiles.

A further object is to provide a method of making pre-grouted mosaic panels that allows stable positioning of tiles during the grouting process, in a considerably simple and cost-effective manner.

Another object is to provide a pre-grouted mosaic tile panel that can be laid in a simpler and quicker manner.

Yet another object of the invention is to provide a method of making pre-grouted mosaic panels whose joints have a non-flat profile, with an aesthetically pleasant appearance.

Another object of the invention is to provide pre-jointed panels that provide a substantially seamless visual effect when they are laid side-by-side, in adjacent positions.

These and other objects, as better explained hereafter, are fulfilled by a method of making pre-grouted mosaic panels as defined in claim 1, wherein a panel is formed from a plurality of mosaic tiles, each having an upper surface and a lower surface, said tiles being laid on a substantially horizontal support surface in mutually spaced positions to define a plurality of grooves, the method being characterized in that it includes a step of placing a first thermoformable polymeric sheet element on the upper and/or lower surfaces of said mosaic tiles and a later step of thermoforming said first sheet element for said first thermoformed sheet element to at least partially fill each of said grooves.

With this particular configuration, the method of the invention affords simple and cost-effective control of joint size, and further prevents the filling material from leaking out of the grooves from the exposed surfaces of the tiles, and avoids the associated cleaning requirements.

In a particularly advantageous variant, the first sheet element may be a thermoformable sheet, designed to fill the grooves to define a plurality of jointing beads and a support layer integral therewith.

Due to this particular feature, the panel will have a very stable structure, because the support layer will be stably held on the tiles, by being integral with the jointing beads.

Furthermore, the panel with this configuration may be easily laid on a wall or support surface to be covered, because it already has a support layer, and will not require the latter to be provided at a later time.

In another aspect, the invention relates to a pre-grouted mosaic panel as defined in claim 20.

Advantageous embodiments of the method are defined by the dependent claims.

BRIEF DESCRIPTION OF THE DRAWINGS

Further characteristics and advantages of the invention will be more apparent from the detailed description of a few preferred, non-exclusive embodiments of a method of making pre-grouted mosaic panels of the invention, which are described as non-limiting examples with the help of the annexed drawings, in which.

DETAILED DESCRIPTION OF A PREFERRED EMBODIMENT

Referring to the above figures, the method of the invention provides pre-grouted mosaic tile panels.

As used herein, the term "pre-grouted" is intended to designate a panel formed of mosaic tiles arranged according to any preset pattern and spaced along one or more predetermined directions to define a plurality of lines, commonly known as grooves.

These are designed to be later filled with a filling material, such as a resin or a polymeric foam, a cementitious material or any other material commonly used for jointing wall or floor tiles, not necessarily in mosaic arrangement, to hold the mosaic tiles joined together and form the panel.

The pre-grouted panel may be directly laid over a surface, such as a wall or a floor, in a quick and fast manner, without requiring any particular skill by the operator.

Figure 1:
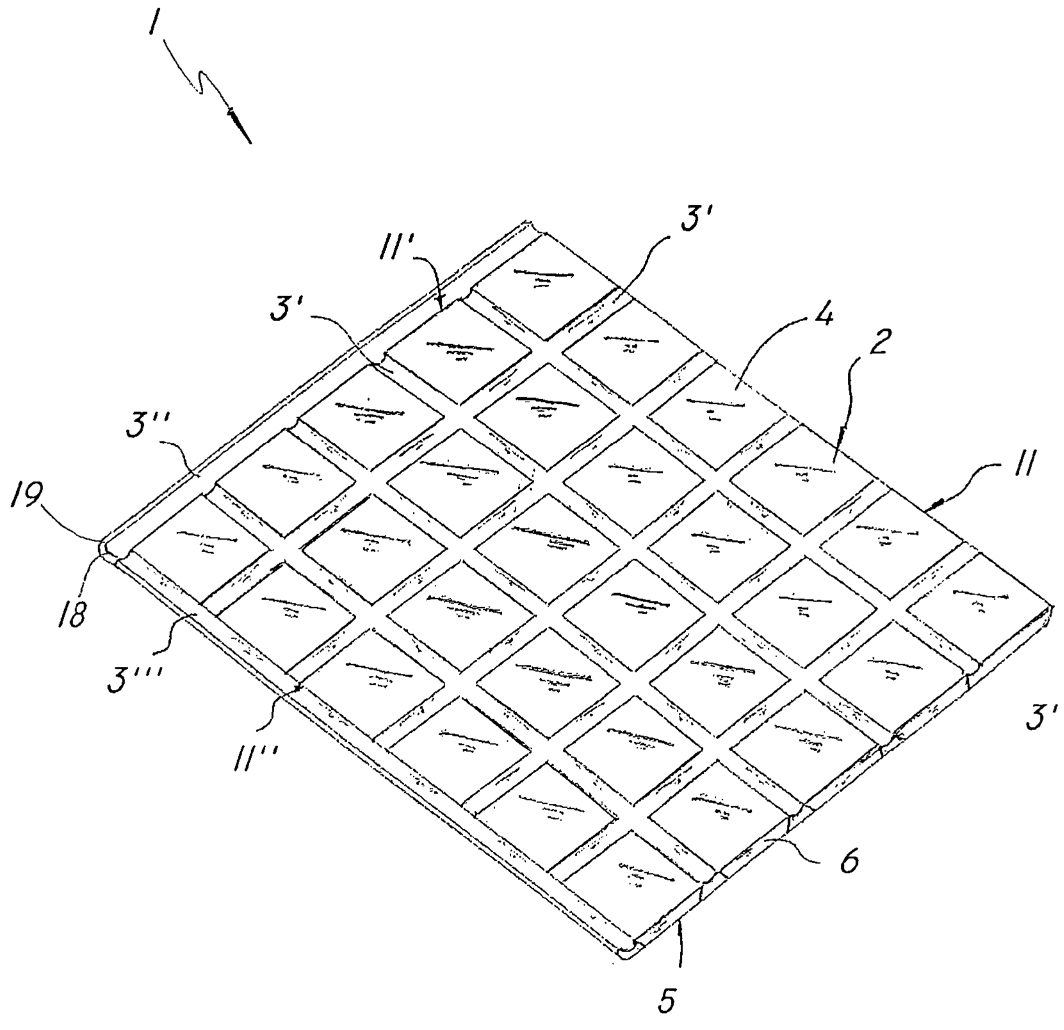
FIG. 1 is a perspective view of a pre-grouted mosaic panel of the invention.

FIG. 1 shows, by way of example and without limitation, a panel 1 that can, but will not necessarily be formed by the method of the present invention, and has a substantially rectangular shape.

The panel 1 is composed of a plurality of tiles 2 aligned along parallel longitudinal rows, transversely offset with substantially constant gaps to define identical rectilinear grooves 3 arranged in a dual series of orthogonal lines.

While the panel 1 of the figures has a substantially rectangular shape, it may have any shape, such as a square, polygonal, circular or irregular shape, without limitation to the size of the panel or the tiles 2, which will not be necessarily identical in shape and/or colors.

The materials that can be used for the tiles 2 may include, by way of example and without limitation to the invention, glass, ceramics, cementitious materials, stone materials or possibly synthetic polymeric materials.

In the embodiments of the figures, the tiles 2 have substantially coplanar upper surfaces 4 which are designed to be exposed once laid, and lower surfaces 5, also coplanar, which are designed to be attached to the laying surface and possibly have grooves or irregularities for increasing the grip with the bedding material.

The upper 4 and lower 5 surfaces of each tile 2 are substantially flat and parallel and will be joined by corresponding sloping lateral surfaces 6.

As used herein, the words "upper" and "lower", related to the surfaces 4, 5 of the tiles 2, are only used by way of illustration and for clarity, with no reference or limitation as to the absolute position of the tiles 2 in space.

The grooves 3 are filled with a special grouting material, such as a thermoplastic or thermoset resin, which at least partially covers the lateral surfaces 6 to define a plurality of jointing beads 3' for connecting the tiles 2 together.

Figure 2:
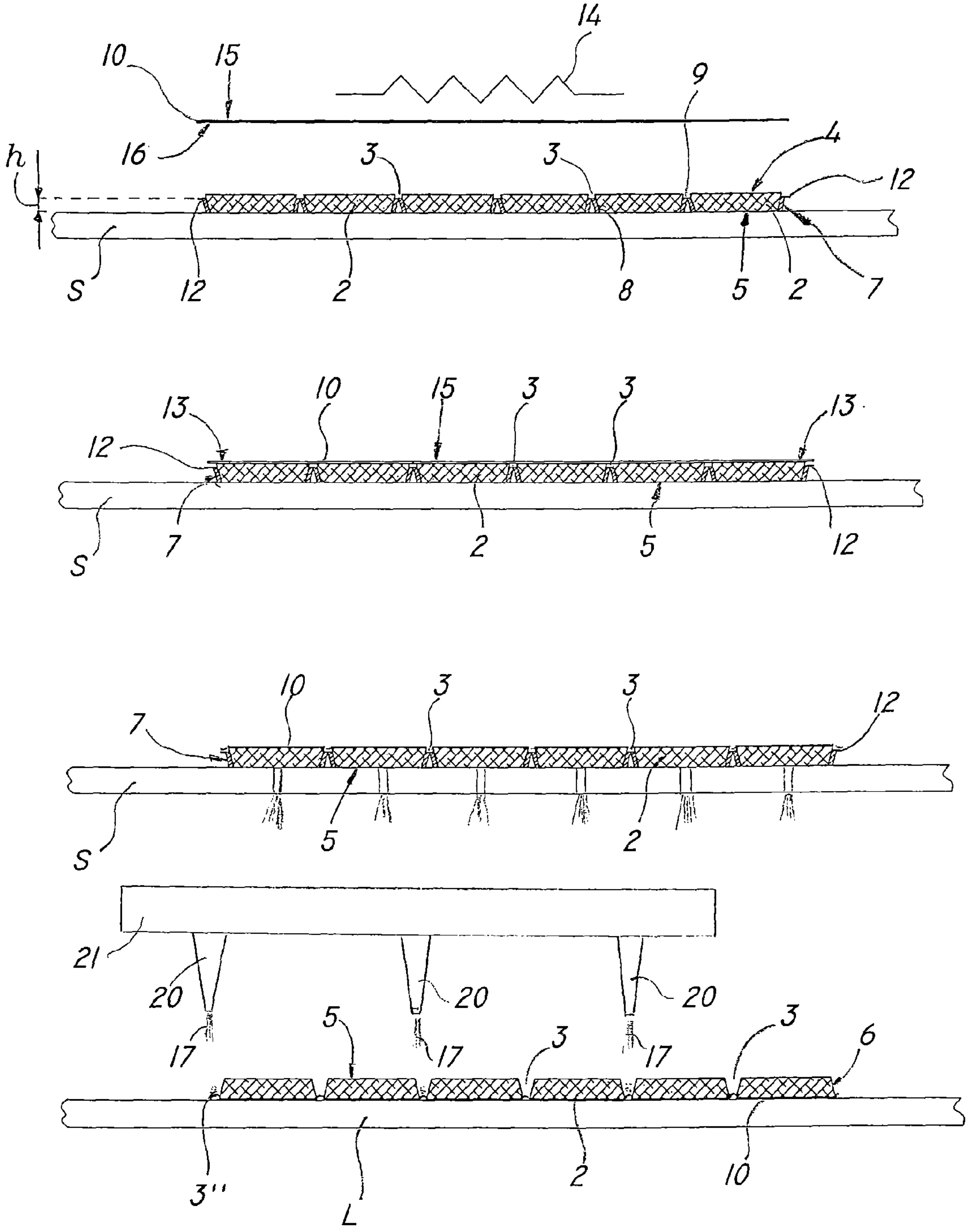
FIG. 2 shows a succession of steps for making a pre-grouted mosaic panel according to a first embodiment of the inventive method.

FIG. 2 shows a succession of steps for making a pre-grouted panel 1 according to a first particular embodiment of the inventive method.

In this particular embodiment of the method, the mosaic tiles 2 are laid over a substantially horizontal support base S in spaced positions, to define the grooves 3.

Particularly, the tiles 2 may be arranged with their lower surfaces 5 in contact with the support base S.

In one variant of this embodiment, the method may include an initial step in which a first mold 7 is provided, having a plurality of trays 8 designed for precisely housing and holding corresponding tiles 2.

The trays 8 may have either an open or a closed bottom and their shape mates the shape of the tiles 2, with such a height h as to leave an upper portion thereof free. Furthermore, the trays 8 are separated by a plurality of ribs 9 which are designed to keep the tiles 2 in spaced relation and define the joints 3.

Once the tiles 2 have been placed in the trays 8, a step follows, in which a first polymeric sheet element 10 is laid on the top surfaces 4 of the mosaic tiles 2.

Then, the first sheet element 10 is thermoformed so that, once it has been thermoformed, it at least partially fills the grooves 3.

In this peculiar embodiment of the invention, the first sheet element 10 may consist of a transparent thermoplastic polymeric film, such as made of PET, PVC or the like.

The film 10 is preferably as large as the finished panel 1 so that it can fully cover the upper surfaces 4 of all the tiles 2.

The thermoforming step includes a step in which the polymeric film 10 is placed above the support base S, in a raised position relative to the tiles 2, and a later step in which such raised film 10 is heated to a predetermined temperature.

The temperature will preferably range from 90° to 130°, but may change according to the material selected for the first sheet element 10.

The polymeric film 10 may be supplied in individual sheets of substantially the same size as or a slightly larger size than the panel 1, to allow the formation of a substantially seamless peripheral edge 11.

In an alternative embodiment, not shown, the polymeric film 10 may be unwound from a roll and cut to size both before and after thermoforming.

In order to facilitate the formation of the peripheral edge 11, the first mold 7 will have an outer peripheral frame 12 susceptible of supporting a peripheral portion 13 of the film 10 during thermoforming.

The film 10 may be heated by one or more electrical resistors 14 located in the proximity of the free top surface 15 of the polymeric film 10, with the latter in a raised position.

Nevertheless, other techniques may be equivalently used for heating the film 10, without departure from the scope of the invention.

The polymeric film 10 may also have a bottom surface 16 with at least one layer of adhesive material for stable and removable bonding with the tiles 2.

The thermoforming process may include an additional step in which pressure is applied on the first sheet element 10, once it has been heated and placed on the tiles 2, for partial filling of the grooves 3.

For example, pressure may be applied by suction of air from the grooves 3, which creates an at least partial vacuum and helps the film 10 to fit therein.

For this purpose, the trays 8 of the first mold 7 preferably have an open bottom to allow air suction from the grooves 3.

Thus, the portions of the film 10 that will partially fit into the grooves 3 will be convex toward the support base S.

Optimal vacuum values may be about 1 atm negative pressure, although such values are by no means limited.

The steps described above will provide an intermediate product composed of the tiles 2 held together by the thermoformed polymeric film 10.

Such intermediate product may be carried to a jointing station, where it will be turned upside-down and placed on a lying base L, that may be the same support surface S as used before, with the thermoformed polymeric film 10 in contact with such base L, for the groves 3 to be accessed from above.

Then, the panel 1 may undergo grouting, by filling a controlled amount of a filling material 17 in each grouted 3, to form the jointing beads 3' and, once the material has set, to obtain the pre-grouted panel 1 ready for application.

The filling material 17 may be a pasty or semisolid state thermoplastic or thermoset resin, which is introduced in the grooves 3 to cover the convex portions of the film 10 and the lateral surfaces 6 of the tiles 2, thereby obtaining the pre-grouted panel 1.

Alternatively, cementitious materials may be used, as well as any material that is commonly used for jointing panels, tiles and similar products.

When curing is substantially completed, the particular convex shape of the film 10 in the grooves 3 will provide concave jointing beads 30, that will add a high aesthetic value to the finished panel 1.

The presence of the thermoformed film 10 will also prevent the resin 17 from leaking out of the grooves 3 during grouting and from even partially covering the exposed surfaces 4 of the tiles 2 and will thus avoid the associated final finishing process.

Advantageously, the resin 17 may be distributed over part of the peripheral edge 13 of the thermoformed film 10, preferably on two contiguous sides thereof. Thus, the pre-grouted panel 1 will have two contiguous sides 11', 11" with jointing beads 3", 3'".

Therefore, during laying, the pre-grouted panel 1 may be placed next to a pair of similar contiguous pre-grouted panels with its edges 11', 11" with the peripheral jointing beads 3", 3'" adjacent to the non pre-grouted edges of the other panels, for ensuring visual continuity of the assembly and further improving the aesthetic quality of the assembly.

Figure 3:
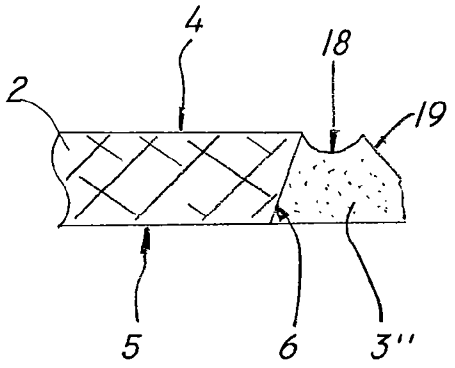
FIG. 3 is a sectional view of a detail of a pre-grouted panel that can be obtained by the method of FIG. 2.

Regardless of the way the panel 1 is manufactured, its peripheral jointing beads 3", 3'" may have a profile with a first concave section 18 and a second slanted section 19, with a slant substantially mating the one of the lateral surface 6 of the tiles 2, as more clearly shown in FIG. 3.

Figure 4:
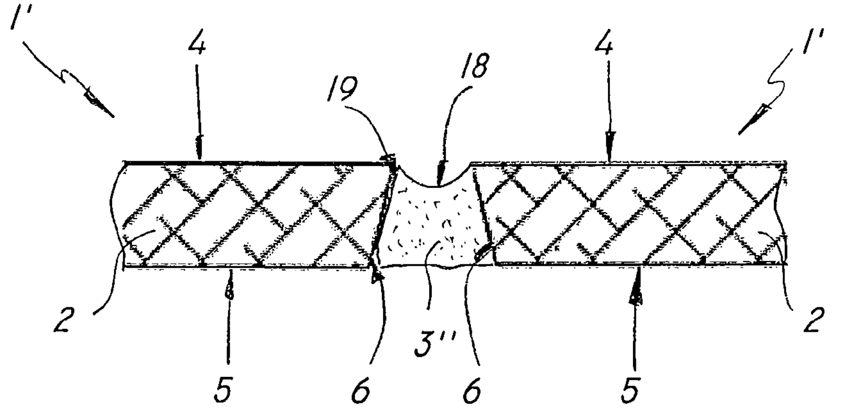
FIG. 4 is a sectional view of a detail of a pair of pre-grouted panels that can be obtained by the method of FIG. 2, and laid in side-by-side arrangement.

Thus, as two pre-grouted panels 1, 1' are placed side by side, the peripheral jointing beads 3", 3'" will cover the edge 11 of the peripheral tiles 2 of the contiguous panel 1', as shown in FIG. 4.

This will impart high visual continuity to the assembly, which will look like a single large panel, and not composed of multiple adjacent panels.

To facilitate the formation of the second slanted section 19, a frame, not shown, may be placed at the periphery of the panel without the jointing beads 3', which frame has at least two contiguous sides with slanted edges that form an angle substantially similar to that of the lateral surfaces 6 of the tiles 2.

The resin or other filling material 17 may be poured into the grooves 3 with any technique known in the art and may be preferably delivered by a plurality of nozzles 20 that are adapted to slide above corresponding grooves 3.

Advantageously, the number of nozzles 20 may be smaller than the maximum number of parallel rows of grooves 3.

The nozzles 20 may be mounted to a nozzle block 21 attached to an arm, not shown, that slides above the lying base L along at least a pair of orthogonal horizontal directions, for grouting a rectangular panel 1 without having to move it over the lying base L.

In a preferred non limiting embodiment, not shown, the sliding arm may be mounted to a guiding carriage which is associated with a beam parallel to one of the two directions of motion, allowing displacement along such first direction.

The beam may be in turn adapted to slide above the lying base L along special guides integral therewith or having a different support structure, and parallel to the second direction.

The arm and/or the nozzle block 21 may be also connected to electronic means for continuous numerical control of the position of the nozzles 20 and their orientation relative to the lying base L to allow filling of grooves 3 of any shape, not necessarily rectilinear.

The pre-grouted panel 1 so obtained may be simply and quickly laid on a wall or any other surface.

The thermoformed film 10 may be easily removed from the panel 1 either before or after the panel 1 is laid, without requiring later removal of any leaked jointing material.

Figure 5:
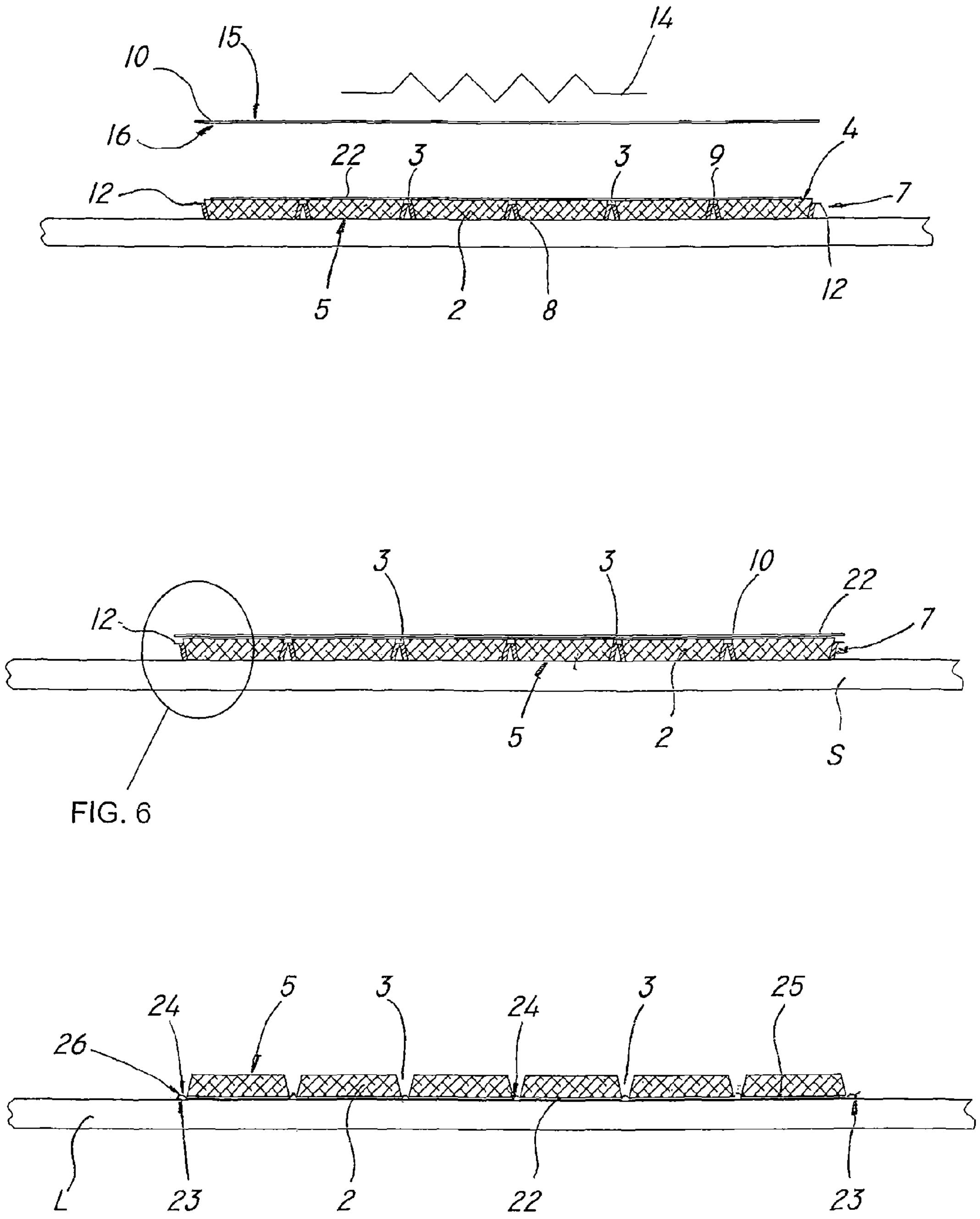
FIG. 5 shows a succession of steps for making a pre-grouted mosaic panel according to a second embodiment of the inventive method.

FIG. 5 shows a second succession of steps for making a pre-grouted panel 1 according to a further embodiment of the method, in which the tiles 2 are laid over the support base S with their lower surfaces 5 facing toward or in contact therewith, with or without the first mold 7.

Figure 6:
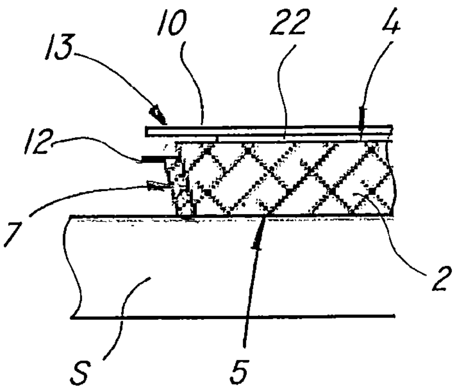
FIG. 6 is a sectional view of a detail of a pre-grouted panel during a step of the method of FIG. 5.

Furthermore, the tiles 2 are connected together by a second sheet element 22, more clearly shown in FIG. 6, which is laid over the upper surfaces 4, and will not necessarily cover the whole of them.

The first sheet element 10, also in this case a thermoformable polymeric film, may be placed on the second sheet element 22 and thermoformed thereon to define a second mold 23 having a bottom wall 24 defined by the thermoformed film 10 itself and a plurality of specially shaped seats 25 adapted to receive corresponding tiles 2.

The thermoforming process may be carried out as described above and may possibly include a step in which a predetermined pressure, possibly negative, is applied.

Then, the non grouted panel 1 composed of the tiles 2 joined together by the second sheet element 22 may be turned upside-down and inserted in the second mold 23 with the top surfaces 4 facing toward the bottom wall 24 of the second mold 23.

Then, the method may proceed with grouting by delivery of the resin or other filling material 17 as described above or according to alternative techniques.

The second sheet element 22 may be removed either at the end of grouting or after laying of the panel 1, in any case preferably after substantial completion of the curing or setting of the grouting material 17.

The second mold 23 may be used for grouting multiple similar panels or panels composed of a different number of tiles 2, as long as they have the same shape.

Also in this case, the use of the first mold 7 will allow the second mold 23 to have peripheral edges 26 adapted to receive the filling material 17 and form a panel 1 with peripheral jointing beads 3", 3'.

According to a further variant, the first embodiment of the method as described above and shown in FIG. 6 may also include the second sheet element 22 bonded to the tiles 2.

In this case, the thermoplastic film 10, with an adhesive layer on its bottom surface 16 will be directly bonded, after thermoforming, to the second sheet element 22, which is preferably non-thermoformable.

Figure 7:
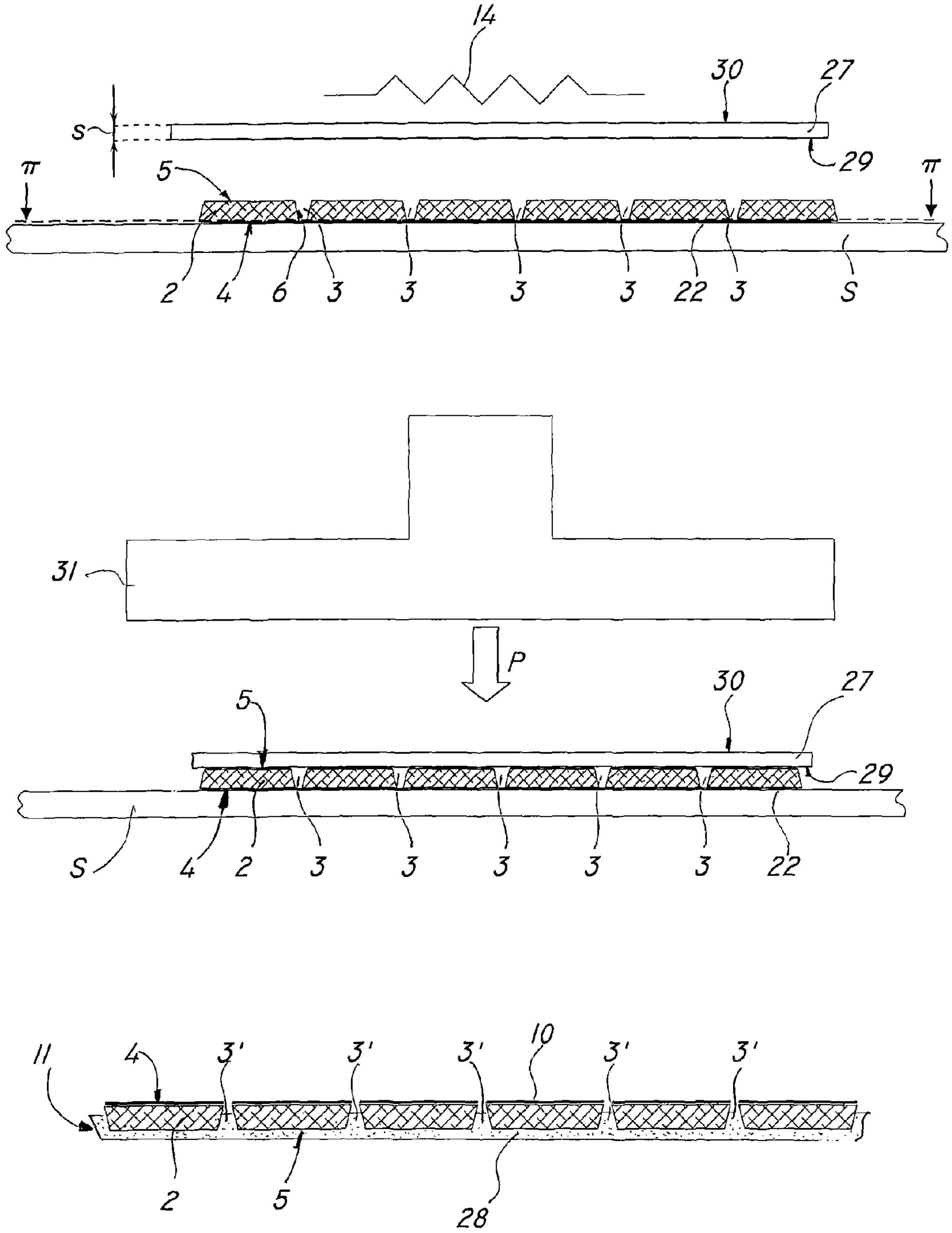
FIG. 7 shows a succession of steps for making a pre-grouted mosaic panel according to a third embodiment of the inventive method.

FIG. 7 shows a third succession of steps for making a pre-grouted panel 1 according to a further embodiment of the inventive method.

In this case, the first sheet element is a thermoformable sheet 27, e.g. a polymeric foam, having a greater thickness s than the above described film 10, which will be placed on the lower surfaces 5 of the tiles 2 and later thermoformed.

The thermoformable material will be preferably a thermoformable polymeric material and, by way of example and without limitation, may be selected from the group comprising polyolefin materials. For instance, it will be a polymeric, preferably polyolefin-, e.g. polyethylene-based foam, also with additives.

Particularly, the thermoformable material will have a density ranging from 25 $Kg/m^3$ to 400 $Kg/m^3$, preferably from 20 $Kg/m^3$ to 100 $Kg/m^3$ and more preferably substantially about 50 $Kg/m^3$.

Figure 9:
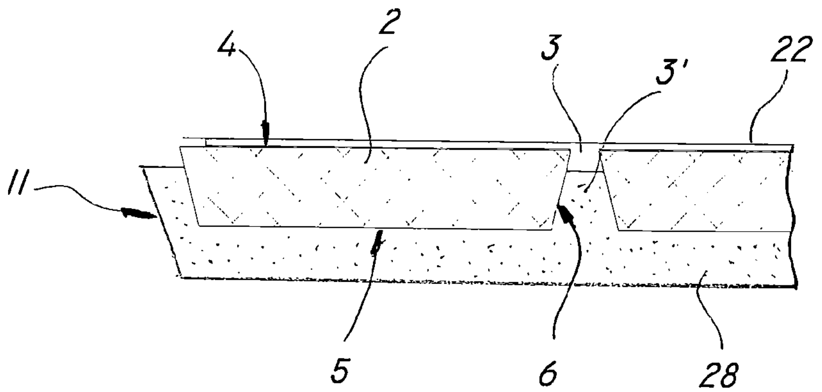
FIG. 9 is a sectional view of a detail of a pre-grouted panel that can be obtained by the method of FIGS. 7 and 8.

The material of the thermoplastic sheet 27 will be designed to define both the jointing beads 3', 3", 3'" of the panel 1 and the support layer 28 thereof, which will be integral with the beads 3', 3", 3'", as more clearly shown in FIG. 9.

In a particular application, the first sheet element 27 will have a thickness s preferably ranging from 1 mm to 15 mm, more preferably from 3 mm to 5 mm.

Nevertheless, the thickness s may be selected according to the material and/or the applications for which the panel 1 is designed, or according to the size of the tiles 2 or the desired size of the support layer 28 and/or the beads 3', 3", 3'".

The first sheet element 27 may be supplied in individual sheets of substantially the same size as or a slightly larger size than the panel 1, to cover the whole lower surfaces 5 of all the tiles 2 and provide a substantially seamless peripheral edge 11 that at least partially surrounds the panel 1.

In the embodiment of the method of FIG. 7, the tiles 2 will be arranged over the support base S, with their upper surfaces 4 in contact with or facing toward the latter, and the lower surfaces 5 facing upwards.

The tiles 2 will be held in spaced positions to define the grooves 3 and may be possibly joined together by the second sheet element 22, e.g. an adhesive film, which is applied to the top surfaces of the tiles 2 but will not necessarily cover the whole of them.

The film 22 will be preferably designed to be removed after forming the panel 1 or laying it on the wall to be covered, and in any case preferably when the curing or setting of the material of the first sheet element 27 is substantially completed.

In one variant of this embodiment of the method, not shown, the mold 27 described for the previous embodiment of the method may be also used. In this case, the film 10 will not be necessarily present.

The method of the invention will thus include a step a) of provision of the tiles 2 and a step b) of arrangement thereof over the substantially horizontal lying plane $\pi$.

After placing the first thermoformable sheet element 27 on the lower surface 5 of the tiles 2, with its top surface 29 facing toward the bottom surface of the tiles 2, the thermoforming step will be carried out thereon, so that it can penetrate the grooves 3 and at least partially fill them to define at least part of the jointing beads 3', 3", 3'".

As used herein, the term "top face" of the first sheet element 27 is intended to designate the face 29 thereof which is designed to contact the lower surface 5 of the tiles 2, whatever the absolute position of the sheet element 27 in space. Accordingly, the term "bottom face" shall designate the face 30 of the same first sheet element 27 which is designed to face toward the laying face of the panel 1 and is not designed to contact the lower surface 5 of the tiles 2.

The thermoforming step may be carried out after the step in which the first sheet element 27 is positioned, or at least partially at the same time as such step.

In the configuration of FIG. 7, the first sheet element 27 will be placed above the support base S at a distance, particularly in a raised position, relative to the tiles 2.

The thermoforming step will include a step in which such first sheet element 27 is heated to a predetermined temperature, preferably from 90° to 100°, and any way varying according to the material selected for the first sheet element 27.

The first sheet element 27 may be heated by any known technique. For example, one or more electrical resistors 14 may be used, which are located in the proximity of the free bottom surface 30 of the first sheet element 27, with the latter in a raised position or in contact with the tiles 2.

In a particular embodiment of the method, the first sheet element 27 may be heated by passing it through a tunnel kiln, not shown. Nevertheless, other known techniques may be equivalently used for heating the first sheet element 27, without departure from the scope of the invention.

Also in this case, the thermoforming process may include an additional step in which pressure P is applied on the first sheet element 27, once it has been heated and placed on the tiles 2, for partial filling of the joints 3.

The step of applying pressure on the first sheet element 27 may be carried out by direct pressing from above, e.g. using a press.

In a non-limiting embodiment of the method, the step of applying pressure P may include the application of a pressure P ranging from 20 $t/cm^2$ e 30 $t/cm^2$ for a time ranging from 5 s to 100 s and preferably from 10 s to 90 s, depending on the desired result.

Alternatively, the step of applying pressure P may involve the creation of a negative pressure, e.g. by suction of air from below, as shown in the previous embodiment of the method. In this case, a negative pressure having a modulus as indicated above, may be applied.

Otherwise, the first sheet element 27 may be placed directly on the support base S with the tiles thereon and the pressure applied on the latter.

This step of pressure application will allow the grooves 3 to be filled with the material of the first sheet element 27, and avoid the need for a further grouting step, by delivery of grouting material 17.

It shall be nevertheless understood that any additional grouting step may be carried out, in any known manner, and using any material suitable for the purpose.

Figure 8:
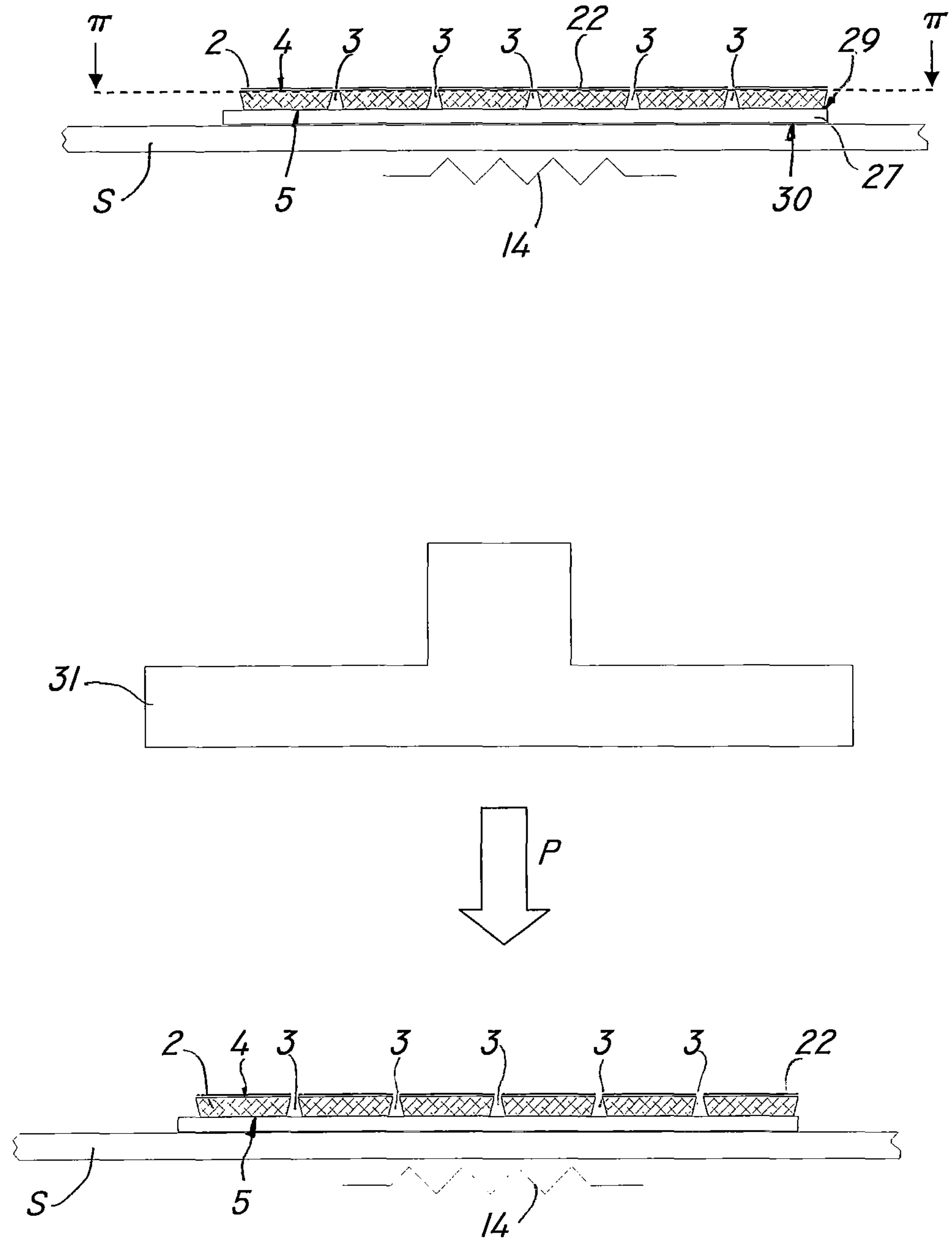
FIG. 8 shows a succession of steps for making a pre-grouted mosaic panel according to a fourth embodiment of the inventive method.

FIG. 8 shows a fourth embodiment of the inventive method, which is similar to the one as shown in FIG. 7, excepting that the tiles 2 are initially held in a substantially horizontal lying plane $\pi$, but in a raised position relative to the support base S and with the upper surfaces 4 facing upwards.

In this case, the first sheet element 27 will be placed on the support base S with the bottom surface 30 facing toward and preferably in contact with it. The mold 27 may be provided also in this case.

The pressure P may be applied in the manner as shown for the embodiment of FIG. 7. If a press 31 is used, it can act both directly on the tiles 2 and on the first sheet element 27. A negative pressure may be also generated.

Regardless of the particular embodiments of the method as described hereinbefore, the method of the invention may advantageously include a first step of distribution of at least one first adhesive layer on the top surface of the first sheet element 9, 27.

By way of example and without limitation, the first adhesive step may be an adhesive film designed to be laid over the top surface 29 of the first sheet element 27.

Instead of or in addition to this step, there may be a second step of distribution of at least one second adhesive layer on the lower surfaces 5 of the tiles 2. By way of example and without limitation, the second adhesive layer may be applied by spraying a glue material.

Preferably, the first and/or second adhesive layers are made of respective materials selected from the group of thermoformable glues.

Conveniently, the step of applying pressure P will be carried out after the first and/or the second adhesive layer distribution steps.

Advantageously, the method also includes a step in which the first heated sheet element 9, 27 is cooled, for example by cooling the mold, if there is any.

Preferably, cooling will be at least partially carried out during the pressure P application step. Cooling may occur either by air or liquid, e.g. water.

The above description clearly shows that the invention fulfils the intended objects and particularly meets the requirement of providing a method of making pre-grouted mosaic panels that affords joint thickness control and prevents the filling material from leaking out of the exposed surface of the tiles, thereby obtaining a finished product of high aesthetic value.

The method of the invention will also provide pre-grouted mosaic panels having high resistance and structural stability, while considerably reducing the number of steps required to obtain the finished product.

The method and panel of this invention are susceptible to a number of changes or variants, within the inventive concept disclosed in the annexed claims. All the details thereof may be replaced by other technically equivalent parts, and the materials may vary depending on different needs, without departure from the scope of the invention.

While the method and panel have been described with particular reference to the accompanying figures, the numerals referred to in the disclosure and claims are only used for the sake of a better intelligibility of the invention and shall not be intended to limit the claimed scope in any manner.

The invention claimed is:

1. A method of making pre-grouted mosaic panels, wherein each panel is formed from a plurality of mosaic tiles each having an upper surface and a lower surface, comprising the steps of:

a) laying said tiles over a substantially horizontal support base in mutually spaced positions, to define a plurality of grooves;

b) placing, after said step of laying said tiles, a first polymeric thermoformable sheet element on an upper surface of said mosaic tiles;

c) thermoforming said first sheet element placed on said tiles, for said first thermoformed sheet element to at least partially fill each of said grooves to provide an intermediate product that comprises said tiles held together by said first polymeric thermoformed sheet element;

d) turning said intermediate product upside-down and placing said intermediate product on a laying base to enable access to said grooves from outside; and e) distributing a filling resin in pasty or semisolid state into said grooves to form a plurality of jointing beads, wherein thermoforming said first sheet element comprises causing portions of the first thermoformed sheet element that at least partially fill the grooves to be convex toward the support base, and wherein distributing the filling resin in the pasty or semisolid state into the grooves comprises causing the filling resin to cover the convex portions of the first thermoformed sheet element, such that after curing of the filling resin, the convex portions provide an upper surface of a mosaic panel with concave jointing beads.

2. The method as claimed in claim 1, wherein said thermoforming step includes a step of providing said first sheet element in a spaced position relative to said tiles and a heating step at a predetermined temperature of said first spaced sheet element.

3. The method as claimed in claim 2, wherein said thermoforming step includes a step of applying a pressure on said first sheet element heated and positioned on said tiles for promoting partial filling of said grooves therewith.

4. The method as claimed in claim 1, wherein said first sheet element is a thermoplastic polymeric film at least as large as a finished panel, said polymeric film having a free top surface and a bottom surface having at least one adhesive layer for stable and removable bonding thereof on said tiles.

5. The method as claimed in claim 1, wherein said first sheet element is a sheet of thermoformable material having a thickness ranging from 1 mm to 15 mm, and designed to fill said grooves to define a plurality of jointing beads and a support layer integral with said jointing beads.

6. The method as claimed in claim 5, wherein said first sheet element is a sheet made of a base material selected from the group consisting of polyolefin materials and polymeric foams.

7. The method as claimed in claim 6, wherein said base material of said sheet has a density ranging from 25 Kg/m3 to 400 Kg/m3.

8. The method as claimed in claim 3, further comprising, before said pressure application step, a first step (g) of distribution of at least one first adhesive layer made of a thermoformable adhesive material over a top surface of said first sheet element, or the first step (g) and a second step (h) of distribution of at least one second adhesive layer made of a thermoformable adhesive material over the lower surfaces of said tiles.

9. The method as claimed in claim 8, wherein said first (g) or said second steps (h) of distribution of said at least one first or second adhesive layers are carried out by spraying.

10. The method as claimed in claim 3, further comprising a step (i) of cooling at least said first heated sheet element.

11. The method as claimed in claim 10, wherein said cooling step is carried out at least partially at a same time as said pressure application step.

12. The method as claimed in claim 1, further comprising an initial step of providing a first mold having a plurality of trays designed for precisely housing and holding corresponding tiles of said plurality of tiles, said trays being separated by a plurality of ribs adapted to hold said tiles in spaced relation, to define said grooves.

13. The method as claimed in claim 12, wherein said first mold has a peripheral frame susceptible of supporting said first sheet element during said thermoforming step, so that said first thermoformed sheet element has a substantially seamless peripheral edge.

14. The method as claimed in claim 13, wherein said tiles are joined together by a second non-thermoformable sheet element laid on upper surfaces of said tiles, said first sheet element being placed on said second sheet element and thermoformed thereon to define a second mold having a bottom wall defined by said first thermoformed sheet element and featuring a plurality of shaped seats for precisely accommodating corresponding tiles.

15. The method as claimed in claim 14, wherein said tiles are inserted in corresponding seats of said second mold with respective upper surfaces of said tiles facing toward said bottom wall.

16. The method as claimed in claim 1, wherein said resin is distributed over at least part of said peripheral edge of said first thermoformed sheet.

* * * * *